US011871449B2

(12) United States Patent
Zhu et al.

(10) Patent No.: US 11,871,449 B2
(45) Date of Patent: Jan. 9, 2024

(54) BACKOFF METHOD AND APPARATUS IN TRANSMISSION PROCESS, DEVICE, SYSTEM, AND STORAGE MEDIUM

(71) Applicants: Beijing Xiaomi Mobile Software Co., Ltd., Beijing (CN); BEIJING UNIVERSITY OF POSTS AND TELECOMMUNICATIONS, Beijing (CN)

(72) Inventors: Yajun Zhu, Beijing (CN); Wei Hong, Beijing (CN); Tong Sha, Beijing (CN); Yong Li, Beijing (CN)

(73) Assignees: Beijing Xiaomi Mobile Software Co., Ltd., Beijing (CN); Beijing University of Posts and Telecommunications, Beijing (CN)

( * ) Notice: Subject to any disclaimer, the term of this patent is extended or adjusted under 35 U.S.C. 154(b) by 474 days.

(21) Appl. No.: 17/267,707

(22) PCT Filed: Aug. 15, 2018

(86) PCT No.: PCT/CN2018/100706
§ 371 (c)(1),
(2) Date: Feb. 10, 2021

(87) PCT Pub. No.: WO2020/034124
PCT Pub. Date: Feb. 20, 2020

(65) Prior Publication Data
US 2021/0321455 A1 Oct. 14, 2021

(51) Int. Cl.
*H04W 74/08* (2009.01)
*H04L 1/1867* (2023.01)
*H04W 74/00* (2009.01)

(52) U.S. Cl.
CPC ....... *H04W 74/0816* (2013.01); *H04L 1/1896* (2013.01); *H04W 74/008* (2013.01)

(58) Field of Classification Search
CPC ............ H04W 28/26; H04W 72/0453; H04W 72/0446; H04W 72/0466; H04W 74/0816; H04W 74/008; H04L 1/1896
See application file for complete search history.

(56) References Cited

U.S. PATENT DOCUMENTS

2011/0255471 A1 10/2011 Sundell et al.
2016/0081010 A1 3/2016 Seok
(Continued)

FOREIGN PATENT DOCUMENTS

CN 102045802 A 5/2011
GB 2542818 A 4/2017

OTHER PUBLICATIONS

Extended European Search Report for European Application No. 18929898.7, dated Feb. 28, 2022.
(Continued)

*Primary Examiner* — Iqbal Zaidi
(74) *Attorney, Agent, or Firm* — Finnegan, Henderson, Farabow, Garrett & Dunner, L.L.P.

(57) ABSTRACT

The present application discloses a backoff method and apparatus in a transmission process, a device, a system, and a storage medium, which relate to the field of communication technology. The method includes: a transmitting device performing LBT in an unlicensed frequency band; the transmitting device transmitting an RTS to a receiving device when the LBT has been successfully performed, the RTS including a first backoff time period; the transmitting device transmitting, after having received a CTS transmitted by the receiving device, a C-CTS to the receiving device, the C-CTS including a second backoff time period.

18 Claims, 7 Drawing Sheets

(56) References Cited

U.S. PATENT DOCUMENTS

2017/0013596 A1* 1/2017 van Phan .......... H04W 74/0816
2018/0343096 A1* 11/2018 Kim ......................... H04L 5/00
2019/0182866 A1* 6/2019 Li ..................... H04W 74/0808

OTHER PUBLICATIONS

Examination Report for Indian Application No. 202147010511, dated Feb. 1, 2022.

* cited by examiner

BACKOFF METHOD AND APPARATUS IN TRANSMISSION PROCESS, DEVICE, SYSTEM, AND STORAGE MEDIUM

CROSS REFERENCE TO RELATED APPLICATIONS

This application is a national phase application based on International Application No. PCT/CN2018/100706, filed Aug. 15, 2018, the content of which is incorporated herein by reference.

TECHNICAL FIELD

The present disclosure relates to a field of communication technology, and more particularly to a backoff method in a transmission process, a backoff apparatus in a transmission process, a device, a system and a storage medium.

BACKGROUND

Mobile devices and mobile internet have gone into user's daily life. High speed development of the mobile internet causes the explosive growth of data, and users propose higher requirements on traffic density, network capacity, transmission rate, time delay and so on. The fifth-generation (5G for short) mobile communication emerges accordingly. The 5G network provides a design of new radio for new scenes and new frequency bands. Further, since the increasing of users' requirements, a problem of shortage of frequency spectral resources is getting worse and licensed frequency bands cannot meet market requirements currently, such that unlicensed frequency bands which have sufficient resources have become an exploration objective of enterprises. In order to ensure fair co-existence between different wireless access technologies of the unlicensed frequency bands, an idle channel detection based listen before talk (LBT for short) technology is introduced into a license assisted access technology.

In related art, a sending device may instruct other devices surrounding the sending device to back off for a long time after LBT is successfully conducted on the unlicensed frequency bands. However, if a channel condition of a receiving device is poor, this data transmission may be failed, such that the backoff of other devices is invalid, which causes an overprotection problem.

SUMMARY

Embodiments of the present disclosure provide a backoff method in a transmission process, a backoff apparatus in a transmission process, a device, a system and a storage medium, which may solve the overprotection problem that other devices back off for a time period even when a clear to send (CTS for short) transmission is failed. The technical solution can be described as follows.

According to a first aspect of the present disclosure, a backoff method in a transmission process is provided. The method includes: performing LBT by a sending device on an unlicensed frequency band, sending a request to send (RTS for short) frame by the sending device to a receiving device when the LBT is successfully performed, in which the RTS frame includes a first backoff time period having a starting time no later than a time when the RTS frame is listened by another device and an ending time which is configured as an expected sending time of a confirmation on clear to send (C-CTS for short) frame, and the C-CTS frame is an acknowledgement frame sent by the sending device after receiving a clear to send (CTS for short) frame sent by the receiving device.

In some embodiments, the method further includes receiving by the sending device the CTS frame sent by the receiving device, and sending the C-CTS frame by the sending device to the receiving device, in which the C-CTS frame includes a second backoff time period having a starting time no later than a time when the C-CTS frame is listened by another device and an ending time which is a time when a current data transmission is finished.

In some embodiments, sending the C-CTS frame by the sending device to the receiving device includes sending the C-CTS frame by the sending device to the receiving device with a first time delay after receiving the CTS frame.

In some embodiments, the first time delay is a short inter-frame space of 16 us.

In some embodiments, the RTS frame further includes a data transmission time which is used by the receiving device to determine a third backoff time period in the CTS frame, the third backoff time period having a starting time no later than a time when the CTS frame is listened by another device and an ending time which is a time when the current data transmission is finished.

In some embodiments, the first backoff time period is carried in an RTS network allocation vector (NAV for short) of the RTS frame.

In some embodiments, the first backoff time period and the data transmission time are carried in a time field of the RTS frame.

In some embodiments, the second backoff time period is carried in a C-CTS NAV of the C-CTS frame.

In some embodiments, the third backoff time period is carried in a CTS NAV of the CTS frame.

According to a second aspect of the present disclosure, a backoff method in a transmission process is provided. The method includes receiving by a receiving device an RTS frame sent by a sending device, in which the RTS frame includes a first backoff time period having a starting time no later than a time when the RTS frame is listened by another device and an ending time which is configured as an expected sending time of a C-CTS frame, and the C-CTS frame is an acknowledgement frame sent by the sending device after receiving a CTS frame sent by the receiving device.

In some embodiments, the method further includes sending by the receiving device the CTS frame to the sending device and receiving by the receiving device the C-CTS frame sent by the sending device, in which the C-CTS frame includes a second backoff time period having a starting time no later than a time when the C-CTS frame is listened by another device and an ending time which is a time when a current data transmission is finished.

In some embodiments, sending by the receiving device the CTS frame to the sending device includes sending the CTS frame by the receiving device to the sending device with a second time delay after successfully decoding the RTS frame within a first predetermined time period, in which the first predetermined time period is a time period timing from a sending time of the RTS frame.

In some embodiments, sending by the receiving device the CTS frame to the sending device includes performing LBT on an unlicensed frequency band by the receiving device after successfully decoding the RTS frame within a first predetermined time period, and sending the CTS frame by the receiving device to the sending device when the LBT is successfully performed.

In some embodiments, the second time delay is a short inter-frame space of 16 us.

In some embodiments, the method further includes acquiring by the receiving device a data transmission time form the RTS frame, determining by the receiving device a third backoff time period based on the data transmission time and generating by the receiving device the CTS frame carrying the third backoff time period. The third backoff time period has a starting time no later than a time when the CTS frame is listened by another device and an ending time which is a time when the current data transmission is finished.

In some embodiments, the first backoff time period is carried in an RTS NAV of the RTS frame.

In some embodiments, the first backoff time period and the data transmission time are carried in a time field of the RTS frame.

In some embodiments, the second backoff time period is carried in a C-CTS NAV of the C-CTS frame.

In some embodiments, the third backoff time period is carried in a CTS NAV of the CTS frame.

According to a third aspect of the present disclosure, a backoff apparatus in a transmission process is provided. The apparatus includes: a first processing module and a first sending module. The first processing module is configured to perform LBT by a sending device on an unlicensed frequency band. The first sending module is configured to send a request to send (RTS for short) frame to a receiving device when the LBT is successfully performed. The RTS frame includes a first backoff time period having a starting time no later than a time when the RTS frame is listened by another device and an ending time which is configured as an expected sending time of a confirmation on clear to send (C-CTS for short) frame, and the C-CTS frame is an acknowledgement frame sent by the sending device after receiving a clear to send (CTS for short) frame sent by the receiving device.

In some embodiments, the apparatus further includes a first receiving module configured to receive the CTS frame sent by the receiving device. The first sending module is configured to send the C-CTS frame to the receiving device, in which the C-CTS frame includes a second backoff time period having a starting time no later than a time when the C-CTS frame is listened by another device and an ending time which is a time when a current data transmission is finished.

In some embodiments, the first sending module is configured to send the C-CTS frame to the receiving device with a first time delay after the CTS frame is received.

In some embodiments, the first time delay is a short inter-frame space of 16 us.

In some embodiments, the RTS frame further includes a data transmission time which is used by the receiving device to determine a third backoff time period in the CTS frame, the third backoff time period having a starting time no later than a time when the CTS frame is listened by another device and an ending time which is a time when the current data transmission is finished.

In some embodiments, the first backoff time period is carried in a network allocation vector (NAV for short) of the RTS frame.

In some embodiments, the first backoff time period and the data transmission time are carried in a time field of the RTS frame.

In some embodiments, the second backoff time period is carried in a C-CTS NAV of the C-CTS frame.

In some embodiments, the third backoff time period is carried in a CTS NAV of the CTS frame.

According to a fourth aspect of the present disclosure, a backoff apparatus in a transmission process is provided. The apparatus includes a second receiving module, configured to receive an RTS frame sent by a sending device, in which the RTS frame includes a first backoff time period having a starting time no later than a time when the RTS frame is listened by another device and an ending time which is configured as an expected sending time of a C-CTS frame, and the C-CTS frame is an acknowledgement frame sent by the sending device after receiving a CTS frame sent by the receiving device.

In some embodiments, the apparatus further includes a second sending module configured to send the CTS frame to the sending device. The second receiving module is configured to receive the C-CTS frame sent by the sending device, in which the C-CTS frame includes a second backoff time period having a starting time no later than a time when the C-CTS frame is listened by another device and an ending time which is a time when a current data transmission is finished.

In some embodiments, the second sending module is configured to send the CTS frame to the sending device with a second time delay after successfully decoding the RTS frame within a first predetermined time period, in which the first predetermined time period is a time period timing from a sending time of the RTS frame.

In some embodiments, the second processing module is configured to perform LBT on an unlicensed frequency band after successfully decoding the RTS frame within a first predetermined time period. The second sending module is configured to send the CTS frame to the sending device when the LBT is successfully performed.

In some embodiments, the second time delay is a short inter-frame space of 16 us.

In some embodiments, the apparatus further includes a second processing module configured to acquire a data transmission time form the RTS frame, determine a third backoff time period based on the data transmission time and generate the CTS frame carrying the third backoff time period. The third backoff time period has a starting time no later than a time when the CTS frame is listened by another device and an ending time which is a time when the current data transmission is finished.

In some embodiments, the first backoff time period is carried in an RTS NAV of the RTS frame.

In some embodiments, the first backoff time period and the data transmission time are carried in a time field of the RTS frame.

In some embodiments, the second backoff time period is carried in a C-CTS NAV of the C-CTS frame.

In some embodiments, the third backoff time period is carried in a CTS NAV of the CTS frame.

According to a fifth aspect of the present disclosure, a terminal is provided. The terminal includes a processor and a memory having at least one instruction, at least one program, a code set or an instruction set stored thereon. The at least one instruction, at least one program, code set or instruction set is loaded and executed by the processor to implement the backoff method in a transmission process according to any of the first aspect and alternative embodiments of the first aspect of the present disclosure.

According to a sixth aspect of embodiments of the present disclosure, a computer-readable storage medium is provided. The computer-readable storage medium has at least one instruction, at least one program, a code set or an instruction set stored thereon. The at least one instruction, at least one program, code set or instruction set is loaded and executed by a processor to implement the backoff method in a transmission process according to any of the first aspect and alternative embodiments of the first aspect of the present disclosure.

The technical solutions provided by the embodiments of the present disclosure may at least include the following beneficial effects.

The sending device performs LBT on the unlicensed frequency band and sends the RTS frame to the receiving device when the LBT is successfully performed. The RTS frame includes the first backoff time period having the starting time no later than a time when the RTS frame is listened by another sending device and the ending time which is configured as the expected sending time of the C-CTS frame. The first backoff time period does not include the data transmission time which is carried in the second backoff time period. Since another sending device backs off for different time periods respectively based on the first backoff time period and the second backoff time period, and the other sending device may not need to back off based on the second backoff time period when the receiving device fails to send the CTS frame, a problem that the other device surrounding the sending device still back off for the data transmission time when the receiving device fails to send the CTS frame can be avoided, thus avoiding an overprotection problem in the transmission process and improving an access efficiency of the new radio based unlicensed access (NR-U for short).

BRIEF DESCRIPTION OF THE DRAWINGS

To illustrate the solutions according to the embodiments of the present disclosure more clearly, accompanying drawings needed for describing the embodiments or the prior art are briefly introduced below. Obviously, the accompanying drawings in the following descriptions are merely some embodiments of the present disclosure, and persons of ordinary skill in the art may obtain other drawings according to the accompanying drawings without making creative efforts.

DETAILED DESCRIPTION

Figure 1:
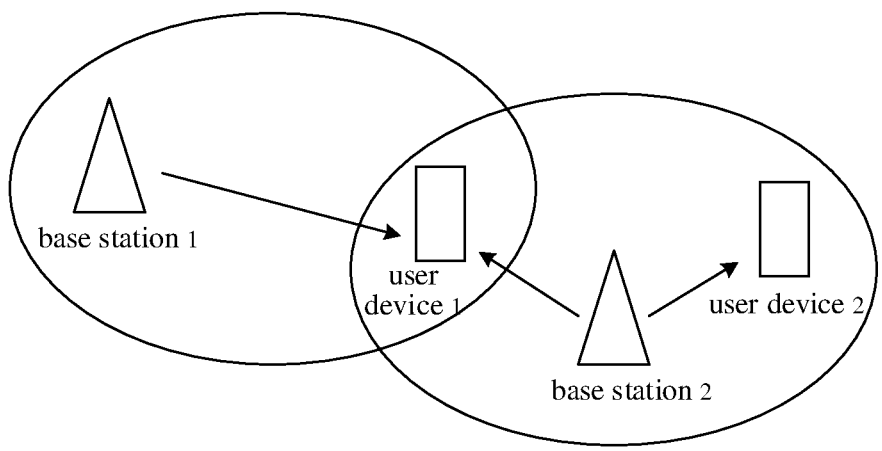
FIG. 1 is a schematic diagram illustrating a mobile communication system in the related art.

To illustrate the objectives, technical solutions and advantages of the present disclosure more clearly, embodiments or the present disclosure are introduced below in detail with reference to drawings.

First of all, the terms involved in the embodiments of the present disclosure are explained as follows.

LBT, refers to a carrier sensing technology used for unlicensed frequency spectral. Before a sending device initiates a session with a receiving device, LBT is used to determine whether a channel is idle. If the channel is idle, the sending device sends an RTS frame to the receiving device after the LBT is successfully performed. If it is listened that another device sends an RTS frame on the channel, the sending device backs off based on a backoff time indicated by the RTS frame sent by the another device. This technology aims to implement a fair sharing of the unlicensed frequency spectral.

NAV, refers to a network allocation vector. NAV indicates a time period. In the present disclosure, NAV indicates a backoff time period. Another device backs off based on the backoff time period indicated by the NAV.

RTS frame, refers to a request to send frame. When the sending device performs data transmission with the receiving device, the sending device sends an RTS frame which includes an NAV of the RTS frame and a data transmission time to the receiving device. When the RTS frame is sent successfully, another surrounding device may listen to the RTS frame and back off based on the backoff time period indicated by the NAV, so as to prevent the other device from occupying the channel, which may result in a failure of the data transmission. The data transmission time is used by the receiving device to generate the NAV in a CTS frame.

CTS frame, refers to a clear to send frame. After the receiving device receives the RTS frame, the receiving device generates a CTS frame based on the data transmission time, and sends the CTS frame to the sending device. The CTS frame includes a CTS NAV. When the CTS is successfully sent, another surrounding device may listen to the RTS frame and back off based on the backoff time period indicated by the CTS NAV, so as to prevent the other device from occupying the channel, which may result in a failure of the data transmission.

C-CTS frame, refers to a confirmation on clear to send frame. The C-CTS frame is an acknowledgement frame sent by the sending device to the receiving device after receiving a CTS frame. The C-CTS frame includes a C-CTS NAV (NAV of the C-CTS frame). In the present disclosure, the backoff time period (during which the other device needs to back off) indicated by the C-CTS NAV is the data transmission time.

NR-U, refers to a new radio based unlicensed access. NR-U is used as a global 5G standard of a new radio design based on an orthogonal frequency division multiplexing (OFDM for short) technology and is a basis of the cellular mobile technology.

DIFS, refers to distributed inter-frame spacing. In a distributed coordination function (DCF for short) protocol, the sending device needs to determine whether the channel is idle before sending data. If the channel is idle, the sending device begins to send data after waiting for a while (i.e., waiting for the time period indicated by DIFS).

SIFS, refers to short inter-frame spacing, which is a spacing time (i.e., minimum inter-frame spacing) between frames when a device occupies the channel to transmit data or perform an interaction. Since the spacing time is short, the device may still have a right to use the channel after a SIFS time interval. SIFS is mainly used as a spacing time of interaction frames between the sending device and the receiving device in the transmission, for example, an interaction interval of ACK frame, CTS frame and so on.

ACK frame, refers to an acknowledgement frame. When the data is successfully transmitted, the receiving device feeds back the ACK frame to the sending device.

TXOP, refers to transmission opportunity, which is a complete opportunity for data transmission.

In order to ensure fair co-existence between different wireless access technologies of 5G based unlicensed frequency bands, LBT technology is introduced in the related art. Since the LBT technology may listen to a channel condition around a sending device but cannot listen to a channel condition around a receiving device, a hidden node problem can be caused. For example, as illustrated in FIG. 1, base station 2 is transmitting data to user device 2, at the same time, since base station 1 cannot listen to the channel condition around the base station 2 (at surroundings of the user device 2), the base station 1 may perform LBT on an unlicensed frequency band in the neighborhood and transmit data to user device 1 when LBT is successfully performed. In this case, the transmission of the statin 2 may interfere in the transmission of the base station 1.

Figure 2:
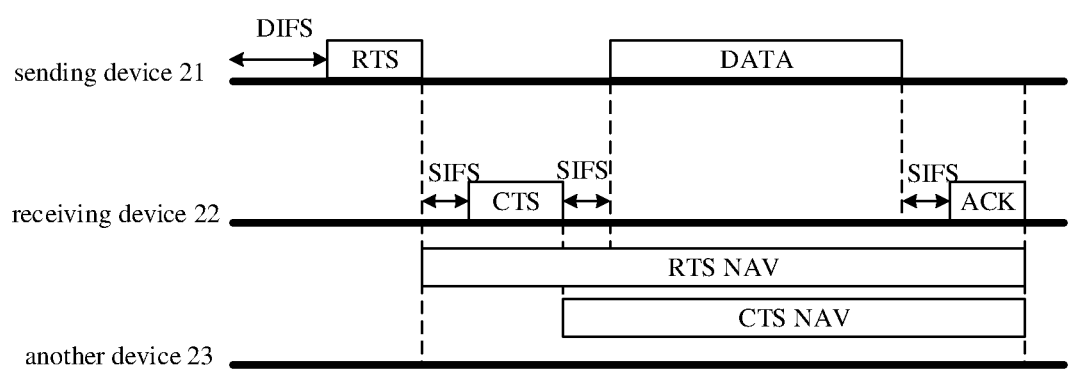
FIG. 2 is a schematic diagram illustrating a backoff method in a transmission process in the related art.

In order to solve the above hidden node problem, an RTS/CTS mechanism in the institute of electrical and electronics engineers 1002.11 (IEEE 1002.11) published in 1997 have been introduced in the related art. For example, as illustrated in FIG. 2, in the technical solution, sending device 21 performs LBT on an unlicensed frequency band, and sends an RTS frame to receiving device 22 after a DIFS time interval if it is listened that the channel is idle. Another device surrounding the receiving device 22 backs off based on an RTS NAV indicated in the RTS frame listened by them. A starting time of the RTS NAV is a time when another device listens to the RTS frame, and an ending time of the RTS NAV is a time when a current data transmission is finished. The receiving device receives the RTS frame sent by the sending device and sends a CTS frame to the sending device after a SIFS time interval of 16 us. Another device surrounding the receiving device backs off based on a CTS NAV indicated in the CTS frame listened by them. The sending device receives the CTS frame sent by the receiving device, and performs data transmission after a SIFS time interval of 16 us. The receiving device sends an ACK frame to the sending device after a SIFS time interval of 16 us after the data transmission is successfully performed, such that the data transmission is finished. The technical solution solves the hidden node problem for the unlicensed frequency spectral.

However, in the above technical solution, the sending device sends the RTS frame to the receiving device, if the receiving device cannot send the CTS frame to the sending device due to a channel access failure, a handshake failure occurs between the devices. However, the RTS frame sent by the sending device may still cause backoff of the other listening device surrounding the sending device, such that an overprotection problem occurs, thus decreasing an access efficiency of the unlicensed frequency band.

Figure 3:
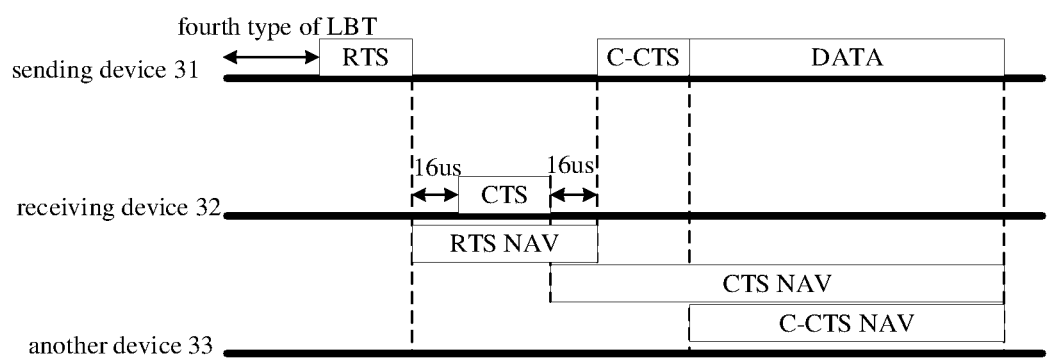
FIG. 3 is a schematic diagram illustrating a backoff method in a transmission process in the related art.

The present disclosure provides a technical solution as follows. A sending device performs LBT on an unlicensed frequency band, and sends an RTS frame to a receiving device if LBT is successfully performed. The RTS frame includes a first backoff time period. The receiving device feeds back a CTS frame after receiving the RTS frame. The CTS frame includes a third backoff time period. The sending device feeds back a C-CTS frame after receiving the CTS frame. The C-CTS frame includes a second backoff time period. The technical solution can be used to solve the overprotection problem. For example, as illustrated in FIG. 3, sending device 31 listens whether a target channel on an unlicensed frequency band is idle by the LBT technology. If the target channel is idle, the sending device 31 sends an RTS frame to receiving device 32. Another device 33 listens to the RTS frame and backs off based on a first backoff time period in the RTS NAV of the RTS frame. The first backoff time period has a starting time no later than a time when the RTS frame is listened by the device 33 and an ending time which is configured as an expected time of sending a C-CTS frame by the sending device 31. The receiving device 32 decodes the RTS frame, determines a third backoff time period based on a data transmission time carried in the RTS frame and generates a CTS frame carrying the third backoff time period. The receiving device 32 sends the CTS frame to the sending device 31 after waiting for a second delay time of 16 us. Another device 33 listens to the CTS frame and backs off based on the third backoff time period in the CTS NAV of the CTS frame. The third backoff time period has a starting time no later than a time when the CTS frame is listened by the device 33 and an ending time which is a time when the data transmission is finished. The sending device 31 sends a C-CTS frame to the receiving device 32 after a first delay time of 16 us. The device 33 listens to the C-CTS frame and backs off based on a second backoff time period in the C-CTS NAV of the C-CTS frame. The second backoff time period has a starting time no later than a time when the C-CTS frame is listened by the device 33 and an ending time which is the time when the data transmission is finished. A handshake between the sending device 31 and the receiving device 32 is finished, and the sending device 31 gets a data transmission opportunity on the unlicensed frequency band. Compared to FIG. 2, the device 33 surrounding the sending device 31 backs off based on the backoff time period which can be configured as the backoff time period indicated in the RTS NAV or the backoff time period indicated in the C-CTS NAV in FIG. 3. If the receiving device 32 fails to feed back the CTS frame, the device 33 does not back off based on the backoff time period indicated in the C-CTS NAV, such that the overprotection problem that another device 23 in FIG. 2 surrounding the sending device 21 still backs off even if the receiving device 22 fails to feed back the CTS frame can be solved.

Figure 4:
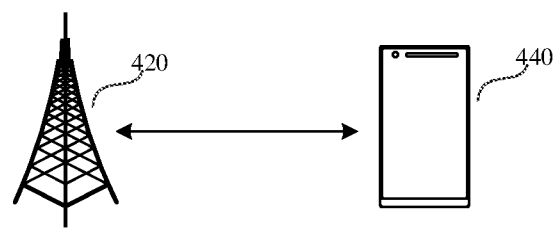
FIG. 4 is a schematic diagram illustrating an environment for implementing a backoff method in a transmission process according to an example embodiment of the present disclosure.

FIG. 4 is a schematic diagram illustrating an environment of implementing a backoff method in a transmission process according to an example embodiment. The environment may include a user device 440 and at least one base station 420 (only one base station is shown in FIG. 4). Optionally, the at least one base station 420 may a micro base station or a macro base station.

In an uplink scene, the user device 440 sends an RTS frame to the at least one base station 420. The at least one base station 420 receives the RTS frame sent by the user device 440 and feeds back a CTS frame to the user device

440. The user device 440 feeds back a C-CTS frame to the at least one base station 420 after receiving the CTS frame.

In a downlink scene, the at least one base station 420 sends an RTS frame to the user device 440. The user device 440 receives the RTS frame sent by the at least one base station 420 and feeds back a CTS frame to the at least one base station 420. The at least one base station 420 feeds back a C-CTS frame to the user device 440 after receiving the CTS frame.

The user device 440 may be a mobile terminal, for example a mobile phone (or called as "cellular" phone) and a device having a mobile communication capacity. For example, the user device 440 may be a portable, pocket or handheld mobile terminal, a computer built-in mobile terminal or a vehicle-mounted mobile terminal. In different mobile communication networks, the user device 440 may have different names, for example, mobile station, mobile, access terminal, user terminal, user agent, user equipment.

Figure 5:
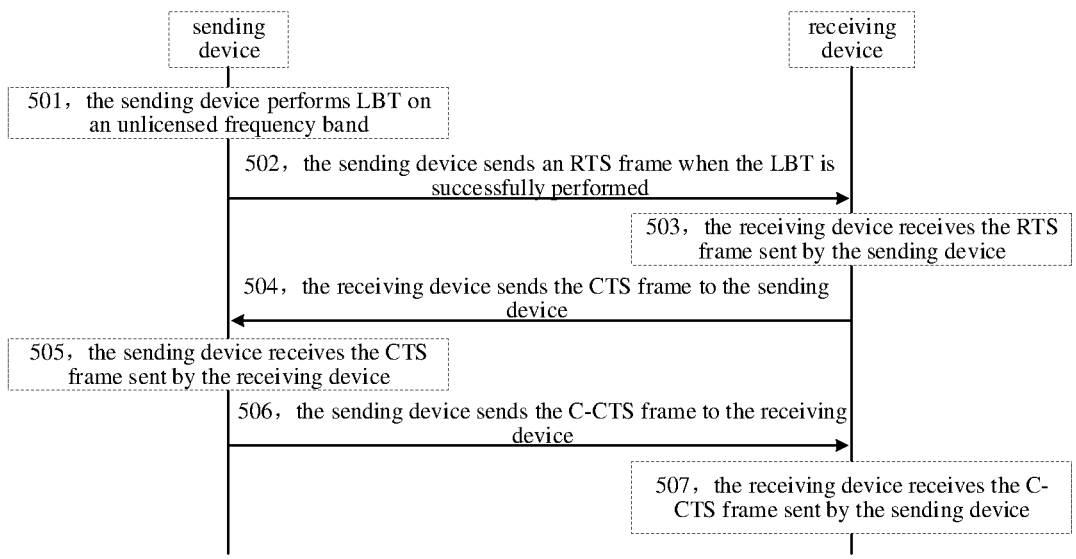
FIG. 5 is a flow chart illustrating a backoff method in a transmission process according to an example embodiment of the present disclosure.

FIG. 5 is flow chart illustrating a backoff method in a transmission process according to an example embodiment of the present disclosure. In the embodiment, for example, the method is applied in the environment illustrated in FIG. 4. The method includes the followings.

At step 501, a sending device performs LBT on an unlicensed frequency band.

Before the sending device initiates a session with a receiving device, the sending device listens to a condition of a target channel to determine whether the target channel is idle. If the target channel is idle, the step at step 501 is executed. If the target channel is not idle, LBT is continually performed for the target channel.

Optionally, the target channel belongs to the unlicensed frequency band. On the unlicensed frequency band, multiple different communication systems may compete for frequency resources. For example the wireless fidelity (WiFi for short) system, the long term evolution (LTF for short) system, a NR-U based communication system and a 5G based mobile communication system may compete for the frequency resources on the unlicensed frequency spectral.

Optionally, the sending device in the embodiment may be a sender in a TXOP process or a sender for a certain time period or in a data transmission process. But it should be construed to limit that the sending device merely has a sending function. In different time periods, different statuses, or different data transmission processes, the same device may be configured as either the sending device or the receiving device.

At step 502, the sending device sends an RTS frame when the LBT is successfully performed.

The sending device may determine the target channel is idle through the LTB technology and send the RTS frame to the receiving device.

Optionally, the sending device listens to the target channel, determines that the target channel is idle (i.e., the LBT is successfully performed) if the target channel is idle within a first time period, and sends the RTS frame to the receiving device. If data transmission energy is listened within the first time period, it indicates that the LBT is unsuccessfully performed. Optionally, the first time period is a predetermined listening time period.

The RTS frame is a request to send frame. Optionally, a first backoff time period is carried in an RTS NAV of the RTS frame. The RTS NAV is a network allocation vector indicated by the RTS frame.

Optionally, the first backoff time period has a starting time no later than a time when the RTS frame is listened by another device and an ending time which is configured as an expected sending time of a C-CTS frame. The C-CTS frame is an acknowledgement frame sent by the sending device after receiving a CTS frame sent by the receiving device.

Optionally, another device surrounding the sending device listens to the RTS frame sent by the sending device through the LBT technology and backs off based on the first backoff time period carried in the RTS NAV.

Optionally, the receiving device in the embodiment may be a receiver in a TXOP process or a receiver for a certain time period or in a data transmission process. But it should be construed to limit that the receiving device merely has a receiving function. In different time periods, different statuses, or different data transmission processes, the same device may be configured as either the sending device or the receiving device.

At step 503, the receiving device receives the RTS frame sent by the sending device.

At step 504, the receiving device sends the CTS frame to the sending device.

The receiving device feeds back the CTS frame to the sending device after receiving the RTS frame sent by the sending device.

At step 505, the sending device receives the CTS frame sent by the receiving device.

At step 506, the sending device sends the C-CTS frame to the receiving device.

Optionally, the sending device sends the C-CTS frame to the receiving device after waiting for a first time delay from a time of receiving the CTS frame.

The C-CTS frame is an acknowledgement frame sent by the sending device after receiving the CTS frame sent by the receiving device. Optionally, a second backoff time period is carried in a C-CTS NAV of the C-CTS frame. The C-CTS NAV is a network allocation vector indicated by the C-CTS frame.

Optionally, the second backoff time period has a starting time no later than the C-CTS frame is listened by another device and an ending time which is a time when a current data transmission is finished.

Optionally, after another device listens to the C-CTS frame, the another device backs off based on the second backoff time period in the C-CTS NAV.

At step 507, the receiving device receives the C-CTS frame sent by the sending device.

The receiving device receives the C-CTS frame sent by the sending device and it is determined that a current handshake is finished between the sending device and the receiving device.

In conclusion, with the backoff method in a transmission process according to the embodiment of the present disclosure, the sending device performs LBT on the unlicensed frequency band and sends the RTS frame to the receiving device when the LBT is successfully performed. The RTS frame includes the first backoff time period. The receiving device sends the CTS frame to the sending device after receiving the RTS frame sent by the sending device and the sending device sends the C-CTS frame to the receiving device after receiving the CTS frame sent by the receiving device. The C-CTS frame includes the second backoff time period. The handshake between the receiving device and the sending device is finished. In the technical solution, the other receiving device may back off for different time periods respectively based on the first backoff time period and the second backoff time period. If the receiving device fails to send the CTS frame, the other receiving device does not back off based on the second backoff time period, such that the overprotection problem that the other device surrounding the sending device still backs off based on an NAV of the listened RTS frame even if the receiving device fails to send the CTS frame in the related art can be solved, thus improving an access efficiency of NR-U.

Figure 6:
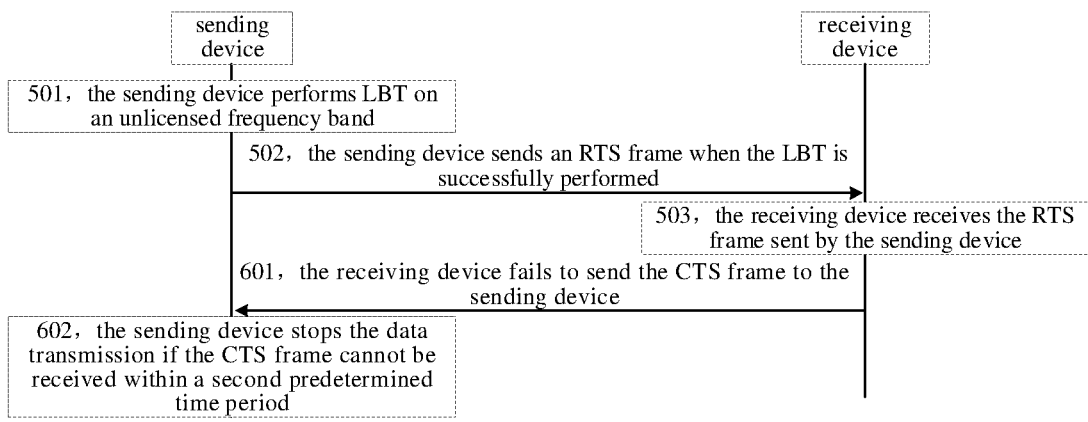
FIG. 6 is a flow chart illustrating a backoff method in a transmission process according to another example embodiment of the present disclosure.

FIG. 6 is flow chart illustrating a backoff method in a transmission process according to another example embodiment of the present disclosure. In the embodiment, for example, the method is applied in the environment illustrated in FIG. 4. It should be noted that steps at step 504 to step 507 in FIG. 5 are replaced with steps at step 601 to step 602. If the CTS frame fed back by the receiving device fails to be sent, the sending device stops the data transmission. Detailed steps can be described as follows.

At step 601, the receiving device fails to send the CTS frame to the sending device.

The receiving device fails to feed back the CTS frame to the sending device after receiving the RTS frame sent by the sending device.

At step 602, the sending device stops the data transmission if the CTS frame fails to be received within a second predetermined time period.

The sending device waits for the CTS frame fed back by the receiving device. If the sending device fails to receive the CTS frame fed back by the receiving device within the second predetermined time period, the sending device determines that the session with the receiving device is failed and stops the data transmission. In this case, the sending device does not send the C-CTS frame to the receiving device, such that other sending device needs not to back off based on the second backoff time period in a C-CTS NAV of the C-CTS frame.

Optionally, the second predetermined time period is set in advance. The second predetermined time period starts from a time when the RTS frame is listened by another receiving device. The second predetermined time period is used to determine whether the receiving device successfully sends the CTS frame.

In conclusion, with the backoff method in a transmission process according to the embodiment of the present disclosure, the sending device performs LBT on the unlicensed frequency band and sends the RTS frame to the receiving device when the LBT is successfully performed. The RTS frame includes the first backoff time period. The receiving device sends the CTS frame to the sending device after receiving the RTS frame sent by the sending device. If the CTS frame fed back by the receiving device fails to be sent, the other receiving device does not back off based on the second backoff time period, such that the overprotection problem that the other device surrounding the sending device still backs off based on the NAV of the listened RTS frame even if the receiving device fails to send the CTS frame in the related art can be solved, thus improving an access efficiency of NR-U.

Figure 7:
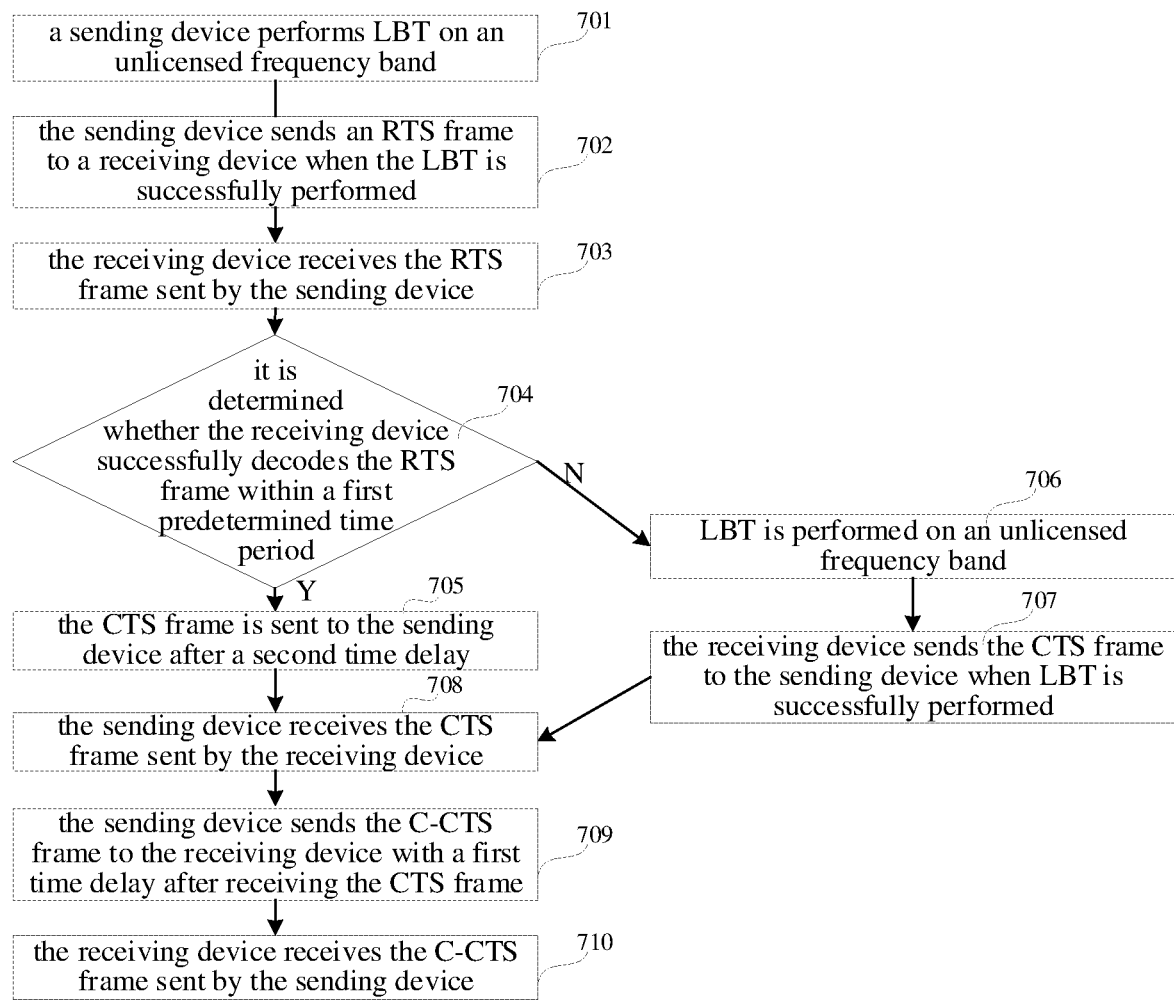
FIG. 7 is a flow chart illustrating a backoff method in a transmission process according to a further example embodiment of the present disclosure.

Based on FIG. 5, the example embodiment illustrated in FIG. 7 further limits a decoding time of the RTS frame, which is a further explanation of the backoff method in a transmission process. In the embodiment, for example, the method is applied in the environment illustrated in FIG. 4. The method includes the followings.

At step 701, a sending device performs LBT on an unlicensed frequency band.

Reference can be made to step 501, and the content is not described here.

At step 702, the sending device sends an RTS frame to a receiving device when the LBT is successfully performed.

The sending device may determine the target channel is idle through the LTB technology and send the RTS frame to the receiving device.

Optionally, the sending device listens to the target channel, determines that the target channel is idle (i.e., the LBT is successfully performed) if the target channel is idle within a first time period, and sends the RTS frame to the receiving device. If data transmission energy is listened within the first time period, it indicates that the LBT is unsuccessfully performed. Optionally, the first time period is a predetermined listening time period.

The RTS frame is a request to send frame. Optionally, the RTS frame includes a first backoff time period and a data transmission time. The first backoff time period and the data transmission time are carried in a time field of the RTS frame.

Optionally, the first backoff time period is carried in an RTS NAV of the RTS frame. The RTS NAV is a network allocation vector of the RTS frame.

Optionally, the first backoff time period has a starting time no later than a time when the RTS frame is listened by another device and an ending time which is configured as an expected sending time of a C-CTS frame. The C-CTS frame is an acknowledgement frame sent by the sending device after receiving a CTS frame sent by the receiving device.

Optionally, another device surrounding the sending device listens to the RTS frame sent by the sending device through the LBT technology and backs off based on the first backoff time period carried in the RTS NAV.

Optionally, the receiving device in the embodiment may be a receiver in a TXOP process or a receiver for a certain time period or in a data transmission process. But it should be construed to limit that the receiving device merely has a receiving function. In different time periods, different statuses, or different data transmission processes, the same device may be configured as either the sending device or the receiving device.

At step 703, the receiving device receives the RTS frame sent by the sending device.

The receiving device receives the RTS frame sent by the sending device. Optionally, the receiving device decodes the RTS frame to obtain the data transmission time.

At step 704, it is determined whether the receiving device successfully decodes the RTS frame within a first predetermined time period.

The receiving device decodes the RTS frame after receiving the RTS frame sent by the sending device. Optionally, it is determined whether the receiving device successfully decodes the RTS frame within the first predetermined time period, if yes, step at step 705 is executed, if not, step at step 706 is executed.

Optionally, the first predetermined time period is set in advance. The first predetermined time period is a time period timing from a sending time of the RTS frame.

At step 705, the CTS frame is sent to the sending device after a second time delay.

The receiving device successfully decodes the RTS frame within the first predetermined time period to obtain the data transmission time. The receiving device determines a third backoff time period based on the data transmission time and generates the CTS frame carrying the third backoff time period. After waiting for the second time delay from decoding the RTS successfully, the CTS frame is sent to the sending device. Optionally, the second time delay is a short inter-frame space of 16 us.

Optionally, the third backoff time period is carried in a CTS NAV of the CTS frame.

Optionally, the third backoff time period has a starting time no later than a time when the CTS frame is listened by another device and an ending time which is a time when the current data transmission is finished.

Optionally, the other device listens to the CTS frame and backs off based on the third backoff time period in the CTS NAV.

At step 706, LBT is performed on an unlicensed frequency band.

If the receiving device successfully decodes the RTS frame within the first predetermined time period, LBT is performed for the target channel on the unlicensed frequency band. Optionally, the receiving device may listen to the target channel on the unlicensed frequency band through the LTB technology for a second time period. It is determined that the target channel is idle if the target channel is idle within the first time period, and step at step 707 is executed. If the target channel is not idle within the first time period, the data transmission is failed.

Optionally, the second time period may be a predetermined listening time period, which starts from an end of the first predetermined time period.

At step 707, the receiving device sends the CTS frame to the sending device when LBT is successfully performed.

The receiving device successfully decodes the RTS frame within the first predetermined time period to obtain the data transmission time. The receiving device determines the third backoff time period based on the data transmission time and generates the CTS frame carrying the third backoff time period. When LBT is successfully performed, the CTS frame is sent to the sending device.

Optionally, the third backoff time period is carried in the CTS NAV of the CTS frame.

Optionally, the third backoff time period has a starting time no later than a time when the CTS frame is listened by another device and an ending time which is a time when the current data transmission is finished.

Optionally, the other device listens to the CTS frame and backs off based on the third backoff time period in the CTS NAV.

At step 708, the sending device receives the CTS frame sent by the receiving device.

At step 709, the sending device sends the C-CTS frame to the receiving device with a first time delay after receiving the CTS frame.

The sending device sends the C-CTS frame to the receiving device after waiting for a first time delay from a time of receiving the CTS frame. The C-CTS frame is an acknowledgement frame sent by the sending device after receiving the CTS frame sent by the receiving device.

Optionally, the first time delay is a short inter-frame space of 16 us.

Optionally, the C-CTS frame includes a second backoff time period. The second backoff time period has a starting time no later than the C-CTS frame is listened by another device and an ending time which is a time when a current data transmission is finished.

Optionally, the second backoff time period is carried in a C-CTS NAV of the C-CTS frame.

Optionally, the other device listens to the C-CTS frame and backs off based on the second backoff time period in the C-CTS NAV.

At step 710, the receiving device receives the C-CTS frame sent by the sending device.

The receiving device receives the C-CTS frame sent by the sending device and it is determined that a current handshake is finished between the sending device and the receiving device and a data transmission opportunity is obtained.

In conclusion, with the backoff method in a transmission process according to the embodiment of the present disclosure, the sending device performs LBT on the unlicensed frequency band and sends the RTS frame to the receiving device when the LBT is successfully performed. The RTS frame includes the first backoff time period. The receiving device sends the CTS frame to the sending device after receiving the RTS frame sent by the sending device. The CTS frame includes the third backoff time period. The sending device sends the C-CTS frame to the receiving device after receiving the CTS frame sent by the receiving device. The C-CTS frame includes the second backoff time period. The handshake between the receiving device and the sending device is finished. In the technical solution, the other receiving device may back off for different time periods respectively based on the first backoff time period and the second backoff time period. If the receiving device fails to send the CTS frame, the other receiving device does not back off based on the second backoff time period, such that the overprotection problem that the other device surrounding the sending device still backs off based on an NAV of the listened RTS frame even if the receiving device fails to send the CTS frame in the related art can be solved, thus improving an access efficiency of NR-U.

Further, the receiving device may send the CTS frame in two different ways by detecting whether the RTS frame is successfully decoded within the first predetermined time period, such that the successful sending of the CTS frame can be ensured and the access efficiency of NR-U is improved.

Figure 8:
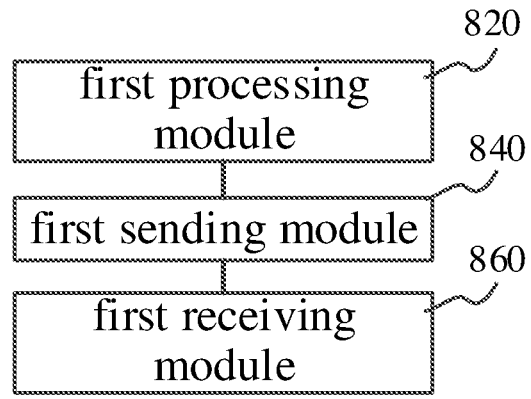
FIG. 8 is a block diagram illustrating a backoff apparatus in a transmission process according to an example embodiment.

FIG. 8 is a block diagram illustrating a backoff apparatus in a transmission process according to an example embodiment. The apparatus may implement a part or all of the backoff method in a transmission process through software, hardware or a combination thereof. The apparatus may include: a first processing module 820 and a first sending module 840.

The first processing module 820 is configured to perform LBT by a sending device on an unlicensed frequency band.

The first sending module 840 is configured to send a request to send (RTS for short) frame to a receiving device when the LBT is successfully performed. The RTS frame includes a first backoff time period having a starting time no later than a time when the RTS frame is listened by another device and an ending time which is configured as an expected sending time of a confirmation on clear to send (C-CTS for short) frame.

The C-CTS frame is an acknowledgement frame sent by the sending device after receiving a clear to send (CTS for short) frame sent by the receiving device.

In some embodiments, the apparatus further includes a first receiving module 860 configured to receive the CTS frame sent by the receiving device.

The first sending module 840 is configured to send the C-CTS frame to the receiving device, in which the C-CTS frame includes a second backoff time period having a starting time no later than a time when the C-CTS frame is listened by another device and an ending time which is a time when a current data transmission is finished.

In some embodiments, the first sending module 840 is configured to send the C-CTS frame to the receiving device with a first time delay after the CTS frame is received.

In some embodiments, the first time delay is a short inter-frame space of 16 us.

In some embodiments, the RTS frame further includes a data transmission time which is used by the receiving device to determine a third backoff time period in the CTS frame, in which the third backoff time period having a starting time no later than a time when the CTS frame is listened by another device and an ending time which is a time when the current data transmission is finished.

In some embodiments, the first backoff time period is carried in a network allocation vector (NAV for short) of the RTS frame.

In some embodiments, the first backoff time period and the data transmission time are carried in a time field of the RTS frame.

In some embodiments, the second backoff time period is carried in a C-CTS NAV of the C-CTS frame.

In some embodiments, the third backoff time period is carried in a CTS NAV of the CTS frame.

In conclusion, with the backoff apparatus in a transmission process according to the embodiment of the present disclosure, the sending device performs LBT on the unlicensed frequency band and sends the RTS frame to the receiving device when the LBT is successfully performed. The RTS frame includes the first backoff time period. The receiving device sends the CTS frame to the sending device after receiving the RTS frame sent by the sending device and the sending device sends the C-CTS frame to the receiving device after receiving the CTS frame sent by the receiving device. The C-CTS frame includes the second backoff time period. The handshake between the receiving device and the sending device is finished. In the technical solution, the other receiving device may back off for different time periods respectively based on the first backoff time period and the second backoff time period. If the receiving device fails to send the CTS frame, the other receiving device does not back off based on the second backoff time period, such that the overprotection problem that the other device surrounding the sending device still backs off based on the NAV of the listened RTS frame even if the receiving device fails to send the CTS frame in the related art can be solved, thus improving an access efficiency of NR-U.

Figure 9:
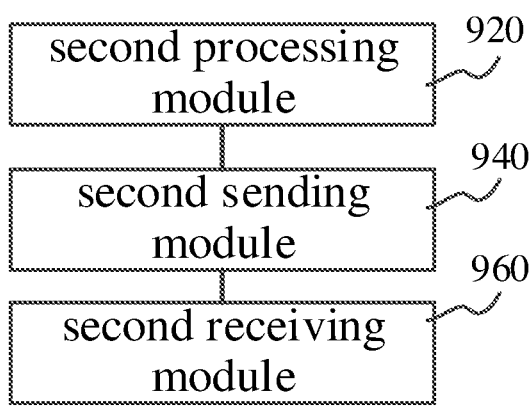
FIG. 9 is a block diagram illustrating a backoff apparatus in a transmission process according to another example embodiment.

FIG. 9 is a block diagram illustrating a backoff apparatus in a transmission process according to another example embodiment. The apparatus may implement a part or all of the backoff method in a transmission process through software, hardware or a combination thereof. The apparatus may include: a second receiving module 960.

The second receiving module 960 is configured to receive an RTS frame sent by a sending device, in which the RTS frame includes a first backoff time period having a starting time no later than a time when the RTS frame is listened by another device and an ending time which is configured as an expected sending time of a C-CTS frame.

The C-CTS frame is an acknowledgement frame sent by the sending device after receiving a CTS frame sent by the receiving device.

In some embodiments, the apparatus further includes: a second sending module 940 configured to send the CTS frame to the sending device, and a second receiving module 960 configured to receive the C-CTS frame sent by the sending device, in which the C-CTS frame includes a second backoff time period having a starting time no later than a time when the C-CTS frame is listened by another device and an ending time which is a time when a current data transmission is finished.

In some embodiments, the second sending module 940 is configured to send the CTS frame to the sending device with a second time delay after successfully decoding the RTS frame within a first predetermined time period, in which the first predetermined time period is a time period timing from a sending time of the RTS frame.

In some embodiments, a second processing module 920 is configured to perform LBT on an unlicensed frequency band after successfully decoding the RTS frame within a first predetermined time period.

The second sending module 940 is configured to send the CTS frame to the sending device when the LBT is successfully performed.

In some embodiments, the second time delay is a short inter-frame space of 16 us.

In some embodiments, the apparatus further includes a second processing module 920 configured to acquire a data transmission time form the RTS frame, determine a third backoff time period based on the data transmission time and generate the CTS frame carrying the third backoff time period. The third backoff time period has a starting time no later than a time when the CTS frame is listened by another device and an ending time which is a time when the current data transmission is finished.

In some embodiments, the first backoff time period is carried in an RTS NAV of the RTS frame.

In some embodiments, the first backoff time period and the data transmission time are carried in a time field of the RTS frame.

In some embodiments, the second backoff time period is carried in a C-CTS NAV of the C-CTS frame.

In some embodiments, the third backoff time period is carried in a CTS NAV of the CTS frame.

In conclusion, with the backoff apparatus in a transmission process according to the embodiment of the present disclosure, the receiving device receives the RTS frame sent by the sending device. The RTS frame includes the first backoff time period. The receiving device receives the C-CTS frame sent by the sending device. The C-CTS frame includes the second backoff time period. In the technical solution, the other receiving device may back off for different time periods respectively based on the first backoff time period and the second backoff time period. If the receiving device fails to send the CTS frame, the other receiving device does not back off based on the second backoff time period, such that the overprotection problem that the other device surrounding the sending device still backs off based on the NAV of the listened RTS frame even if the receiving device fails to send the CTS frame in the related art can be solved, thus improving an access efficiency of NR-U.

Figure 10:
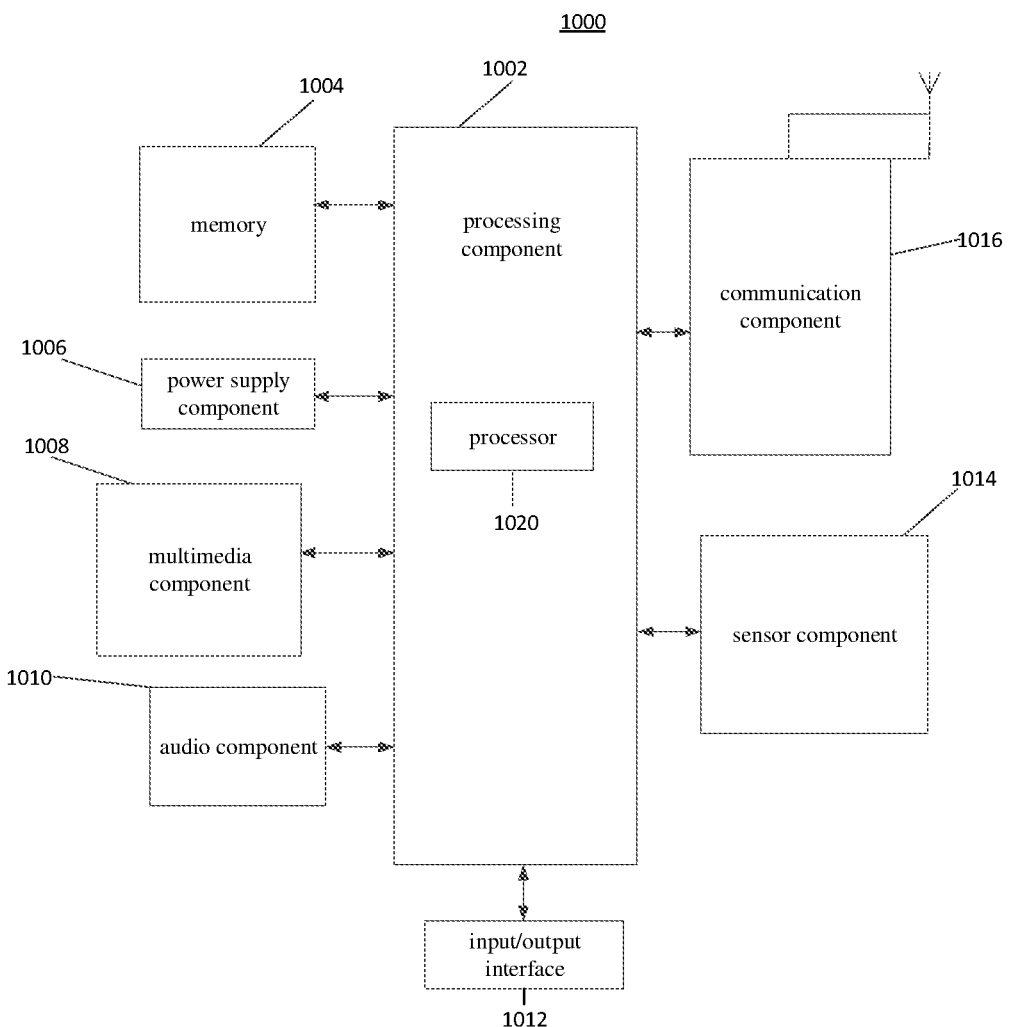
FIG. 10 is a block diagram illustrating a backoff apparatus in a transmission process according to a further example embodiment.

FIG. 10 is a block diagram illustrating a backoff apparatus 1000 in a transmission process according to yet another example embodiment. The apparatus may be configured as a sending device or a receiving device. For example, the apparatus 1000 may be a mobile phone, a computer, a digital broadcasting terminal, a messaging device, a game console, a tablet device, a medical device, a fitness device, a personal digital assistant, and so on.

Referring to FIG. 10, the apparatus 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 generally controls the overall operations of the apparatus 1000, such as operations associated with display, telephone calls, data communications, camera operations, and recording operations. The processing component 1002 may include one or more processors 1020 to execute instructions to complete all or part of the steps of the aforementioned data transmission method. In addition, the processing component 1002 may include one or more modules to facilitate the interaction between the processing component 1002 and other components. For example, the processing component 1002 may include a multimedia module to facilitate the interaction between the multimedia component 1008 and the processing component 1002.

The memory 1004 is configured to store various types of data to support operations in the apparatus 1000. Examples of these data include instructions for any application or method operating on the apparatus 1000, contact data, phone book data, messages, pictures, videos, etc. The memory 1004 may be implemented by any type of volatile or non-volatile storage device or their combination, such as a static random access memory (SRAM), an electrically erasable programmable read-only memory (EEPROM), an erasable programmable read only memory (EPROM), a programmable read only memory (PROM), a read only memory (ROM), a magnetic memory, a flash memory, a magnetic or optical disk.

The power component 1006 provides power to various components of the apparatus 1000. The power component 1006 may include a power management system, one or more power supplies, and other components associated with generating, managing, and distributing power to the device 1000.

The multimedia component 1008 includes a screen that provides an output interface between the apparatus 1000 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of the touch or slide action, but also detect the duration and pressure related to the touch or slide operation. In some embodiments, the multimedia component 1008 includes a front camera and/or a rear camera. When the apparatus 1000 is in an operation mode, such as a shooting mode or a video mode, the front camera and/or the rear camera can receive external multimedia data. Each front camera and rear camera may be a fixed optical lens system or have focal length and optical zooming capabilities.

The audio component 1010 is configured to output and/or input audio signals. For example, the audio component 1010 includes a microphone (MIC), and when the apparatus 1000 is in an operation mode, such as a call mode, a recording mode, and a voice recognition mode, the microphone is configured to receive external audio signals. The received audio signal may be further stored in the memory 1004 or transmitted via the communication component 1016. In some embodiments, the audio component 1010 further includes a speaker for outputting audio signals.

The I/O interface 1012 provides an interface between the processing component 1002 and a peripheral interface module. The peripheral interface module may be a keyboard, a click wheel, a button, and the like. These buttons may include but are not limited to: a home button, a volume button, a start button, and a lock button.

The sensor component 1014 includes one or more sensors for providing the apparatus 1000 with various aspects of state evaluation. For example, the sensor component 1014 may detect the opening/closing state of the apparatus 1000 and the relative positioning of the components. For example, the component is the display and the keypad of the apparatus 1000. The sensor component 1014 may also detect the position changes of the apparatus 1000 or a component of the apparatus 1000, a presence or absence of contacts between the user and the apparatus 1000, an orientation or an acceleration/deceleration of the apparatus 1000, and temperature changes of the apparatus 1000. The sensor assembly 1014 may include a proximity sensor configured to detect the presence of nearby objects when there is no physical contact. The sensor component 1014 may also include a light sensor, such as a CMOS or CCD image sensor, for use in imaging applications. In some embodiments, the sensor component 1014 may also include an acceleration sensor, a gyroscope sensor, a magnetic sensor, a pressure sensor or a temperature sensor.

The communication component 1016 is configured to facilitate wired or wireless communication between the apparatus 1000 and other devices. The apparatus 1000 may access a wireless network based on a communication standard, such as WiFi, 2G, or 3G, or a combination thereof. In an example embodiment, the communication component 1016 receives a broadcast signal or broadcast related information from an external broadcast management system via a broadcast channel. In an example embodiment, the communication component 1016 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an example embodiment, the apparatus 1000 may be implemented by one or more application specific integrated circuits (ASIC), digital signal processors (DSP), digital signal processing devices (DSPD), programmable logic devices (PLD), a field programmable gate array (FPGA), controllers, microcontrollers, microprocessors, or other electronic components, used to implement the above-mentioned data transmission method.

In an example embodiment, there is also provided a non-transitory computer-readable storage medium including instructions, such as the memory 1004 including instructions, which may be executed by the processor 1020 of the apparatus 1000 to complete the above data transmission method. For example, the non-transitory computer-readable storage medium may be a ROM, a random access memory (RAM), a CD-ROM, a magnetic tape, a floppy disk, an optical data storage device, etc.

Figure 11:
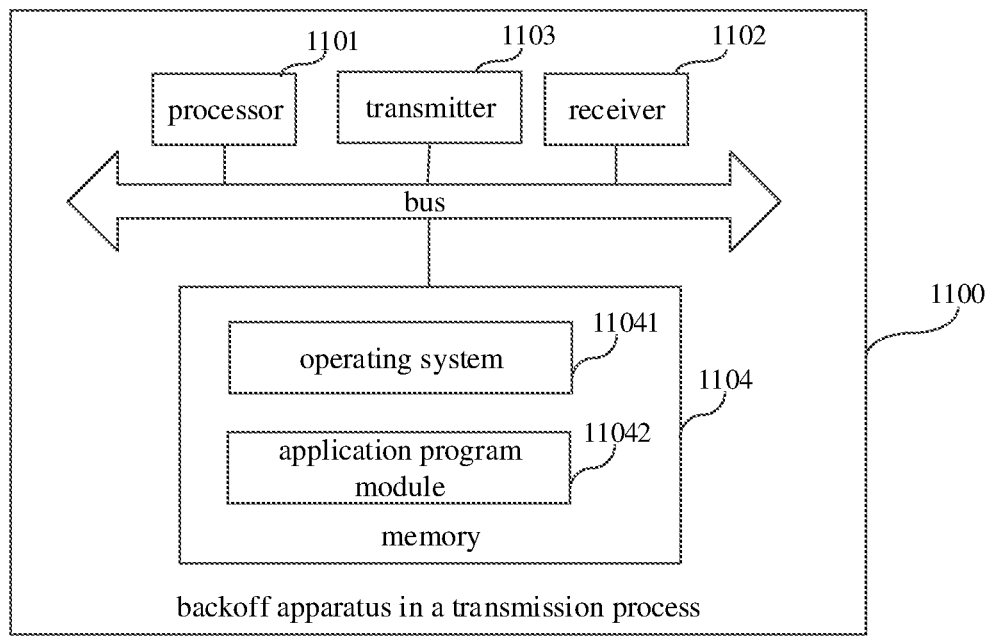
FIG. 11 is a block diagram illustrating a backoff apparatus in a transmission process according to a still example embodiment.

FIG. 11 is a block diagram illustrating a backoff apparatus 1100 in a transmission process according to another example embodiment. The apparatus may be configured as a sending device or a receiving device. For example, the apparatus 1100 may be provided as a base station. Referring to FIG. 11, the apparatus 1100 may include a processor 1101, a receiver 1102, a transmitter 1103 and a memory 1104. The receiver 1102, the transmitter 1103 and the memory 1104 are coupled to the processor 1101 respectively via a bus.

The processor 1101 includes one or more processing cores. The processor 1101 performs the backoff method in a transmission process in the embodiments of the present disclosure which is performed by a sending device by running software programs and modules. The memory 1104 may be configured to store the software programs and modules. In detail, the memory 1104 may store an operating system 11041, at least one functional application program module 11042. The receiver 1102 is configured to receive communication data sent by another device. The transmitter 1103 is configured to send communication data to another device.

Figure 12:
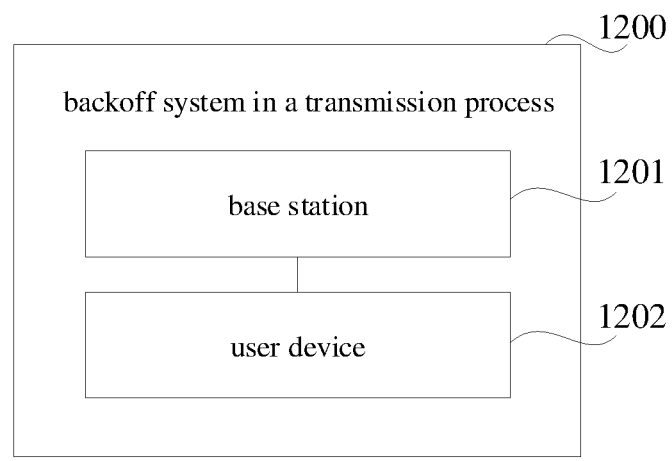
FIG. 12 is a block diagram illustrating a backoff apparatus in a transmission process according to yet another example embodiment.

FIG. 12 is a block diagram illustrating a backoff system 1200 in a transmission process according to another example embodiment. As illustrated in FIG. 12, the backoff system 1200 includes a base station 1201 and a user device 1202.

The base station 1201 is configured to perform the backoff method in a transmission process in the embodiment described with reference to FIG. 4 which is performed by a base station.

The user device 1202 is configured to perform the backoff method in a transmission process in the embodiment described with reference to FIG. 4 which is performed by a user device.

In an example embodiment, there is provided a computer-readable storage medium. The computer-readable storage medium is nonvolatile and has computer programs stored thereon. The computer programs are executed by a processing means to implement the backoff method in a transmission process in the embodiments of the present disclosure.

In an example embodiment, there is provided a computer program. The computer program has instructions stored thereon. When the instructions are executed by a computer, the computer is caused to implement the backoff method in a transmission process in the embodiments of the present disclosure.

In an example embodiment, there is provided a chip. The chip includes a programmable logic circuit and/or program instructions. When the chip runs, the backoff method in a transmission process in the embodiments of the present disclosure may be implemented.

Those skilled in the art will easily think of other embodiments of the present disclosure after considering the specification and practicing the present disclosure. This application is intended to cover any variations, uses, or adaptive changes of the present disclosure. These variations, uses, or adaptive changes follow the general principles of the present disclosure and include common knowledge or conventional technical means in the technical field not disclosed in the present disclosure. The description and the embodiments are only regarded as exemplary, and the true scope and spirit of the present disclosure are pointed out by the appended claims.

It should be understood that the present disclosure is not limited to the precise structure that has been described above and shown in the drawings, and various modifications and changes may be made without departing from its scope. The scope of the present disclosure is only limited by the appended claims.

What is claimed is:

1. A backoff method in a transmission process, comprising:
    performing, by a sending device, listen before talk (LBT) on an unlicensed frequency band; and
    sending, by the sending device, a request to send (RTS) frame to a receiving device at a time the LBT is successfully performed, wherein the RTS frame comprises a first backoff time period having a starting time no later than a time the RTS frame is listened by another device and an ending time which is configured as an expected sending time of a confirmation on clear to send (C-CTS) frame, wherein the C-CTS frame is an acknowledgement frame sent by the sending device after receiving a clear to send (CTS) frame sent by the receiving device;
    receiving, by the sending device, the CTS frame sent by the receiving device; and
    sending, by the sending device, the C-CTS frame to the receiving device, wherein the C-CTS frame includes a second backoff time period having a starting time no later than a time the C-CTS frame is listened by another device and an ending time which is a time a current data transmission is finished.

2. The method of claim 1, wherein sending, by the sending device, the C-CTS frame to the receiving device comprises:
    sending, by the sending device, the C-CTS frame to the receiving device with a first time delay after receiving the CTS frame.

3. The method of claim 2, wherein the first time delay is a short inter-frame space of 16 us.

4. The method of claim 1, wherein the RTS frame further comprises a data transmission time,
    wherein the data transmission time is used by the receiving device to determine a third backoff time period in the CTS frame, the third backoff time period having a starting time no later than a time the CTS frame is listened by another device and an ending time which is a time the current data transmission is finished.

5. The method of claim 4, wherein the first backoff time period is carried in an RTS network allocation vector (NAV) of the RTS frame.

6. The method of claim 4, wherein the first backoff time period and the data transmission time are carried in a time field of the RTS frame.

7. The method of claim 4, wherein the second backoff time period is carried in a C-CTS NAV of the C-CTS frame.

8. The method of claim 4, wherein the third backoff time period is carried in a CTS NAV of the CTS frame.

9. A backoff method in a transmission process, comprising:
    receiving, by a receiving device, a request to send (RTS) frame sent by a sending device, wherein the RTS frame comprises a first backoff time period having a starting time no later than a time the RTS frame is listened by another device and an ending time which is configured as an expected sending time of a confirmation on clear to send (C-CTS) frame, wherein the C-CTS frame is an acknowledgement frame sent by the sending device after receiving a clear to send (CTS) frame sent by the receiving device;
    sending, by the receiving device, the CTS frame to the sending device; and
    receiving, by the receiving device, the C-CTS frame sent by the sending device, wherein the C-CTS frame comprises a second backoff time period having a starting time no later than a time the C-CTS frame is listened by another device and an ending time which is a time a current data transmission is finished.

10. The method of claim 9, wherein sending, by the receiving device, the CTS frame to the sending device comprises: sending, by the receiving device, the CTS frame to the sending device with a second time delay after successfully decoding the RTS frame within a first predetermined time period; wherein the first predetermined time period is a time period timing from a sending time of the RTS frame.

11. The method of claim 9, wherein sending, by the receiving device, the CTS frame to the sending device comprises:

performing, by the receiving device, listen before talk (LBT) on an unlicensed frequency band after successfully decoding the RTS frame within a first predetermined time period; and sending, by the receiving device, the CTS frame to the sending device at a time the LBT is successfully performed.

12. The method of claim 10, wherein the second time delay is a short inter-frame space of 16 us.

13. The method of claim 10, further comprising:

acquiring, by the receiving device, a data transmission time form the RTS frame;

determining, by the receiving device, a third backoff time period based on the data transmission time, wherein the third backoff time period has a starting time no later than a time the CTS frame is listened by another device and an ending time which is a time the current data transmission is finished; and generating, by the receiving device, the CTS frame carrying the third backoff time period.

14. The method of claim 13, wherein the first backoff time period is carried in an RTS network allocation vector (NAV) of the RTS frame.

15. The method of claim 13, wherein the first backoff time period and the data transmission time are carried in a time field of the RTS frame.

16. The method of claim 13, wherein the second backoff time period is carried in a C-CTS NAV of the C-CTS frame.

17. The method of claim 13, wherein the third backoff time period is carried in a CTS NAV of the CTS frame.

18. A backoff apparatus in a transmission process, comprising:

a processor; and a memory storing instructions executable by the processor, wherein the processor is configured to:

perform listen before talk (LBT) by a sending device on an unlicensed frequency band; and send a request to send (RTS) frame to a receiving device at a time the LBT is successfully performed, wherein the RTS frame comprises a first backoff time period having a starting time no later than a time the RTS frame is listened by another device and an ending time which is configured as an expected sending time of a confirmation on clear to send (C-CTS) frame, wherein the C-CTS frame is an acknowledgement frame sent by the sending device after receiving a clear to send (CTS) frame sent by the receiving device;

receive the CTS frame sent by the receiving device; and send the C-CTS frame to the receiving device, wherein the C-CTS frame includes a second backoff time period having a starting time no later than a time the C-CTS frame is listened by another device and an ending time which is a time a current data transmission is finished.

* * * * *